(12) United States Patent
Kim

(10) Patent No.: US 7,478,866 B2  
(45) Date of Patent: Jan. 20, 2009

(54) STRUCTURE OF AN ASSIST HANDLE MOUNTING BRACKET FOR ABSORBING IMPACT OF VEHICLES

(75) Inventor: Yong Chae Kim, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/646,076

(22) Filed: Dec. 26, 2006

(65) Prior Publication Data

US 2008/0079287 A1 Apr. 3, 2008

(30) Foreign Application Priority Data

Sep. 13, 2006 (KR) .................... 10-2006-0088634

(51) Int. Cl.  
*B60N 3/02* (2006.01)

(52) U.S. Cl. .................................. 296/187.05

(58) Field of Classification Search ............ 296/187.05, 296/187.03, 187.01, 29, 30, 1.02, 1.04  
See application file for complete search history.

(56) References Cited

U.S. PATENT DOCUMENTS

| | | | | |
|---|---|---|---|---|
| 5,575,500 A | * | 11/1996 | Mimura et al. | 280/751 |
| 5,741,044 A | * | 4/1998 | Kawai et al. | 296/187.05 |
| 5,988,733 A | * | 11/1999 | Kamo et al. | 296/187.05 |
| 6,042,176 A | * | 3/2000 | Ikeda et al. | 296/187.05 |
| 6,293,614 B1 | * | 9/2001 | Takahara et al. | 296/187.05 |
| 6,431,640 B1 | * | 8/2002 | Sakuma et al. | 296/187.05 |
| 6,679,538 B1 | * | 1/2004 | Sturt | 296/97.9 |
| 6,779,836 B2 | * | 8/2004 | Bachmann et al. | 296/216.08 |
| 2005/0212318 A1 | * | 9/2005 | Hui et al. | 296/29 |
| 2005/0248167 A1 | * | 11/2005 | Totani et al. | 296/1.02 |
| 2007/0200380 A1 | * | 8/2007 | Stolarczyk et al. | 296/1.02 |

FOREIGN PATENT DOCUMENTS

| | | |
|---|---|---|
| JP | 08-310287 | 11/1996 |
| JP | 10-181490 | 7/1998 |
| JP | 2001-233110 | 8/2001 |
| JP | 2004-224065 | 8/2004 |
| KR | 1998-061651 | 11/1998 |
| KR | 2003-0000332 | 1/2003 |

* cited by examiner

*Primary Examiner*—Hilary Gutman  
(74) *Attorney, Agent, or Firm*—Morgan, Lewis & Bockius LLP

(57) ABSTRACT

The present invention relates to a structure of an assist handle mounting bracket for absorbing the impact of a vehicle which is provided between a head lining and a roof side rail panel and to which an assist handle is coupled by a fixing member. A structure of an assist handle mounting bracket according to an exemplary embodiment of the present invention can alleviate the impact during the collision of the head of a passenger and the assist handle so as to minimize injury to the passenger.

4 Claims, 2 Drawing Sheets

STRUCTURE OF AN ASSIST HANDLE MOUNTING BRACKET FOR ABSORBING IMPACT OF VEHICLES

CROSS-REFERENCE TO RELATED APPLICATION

This application claims priority to Korean Patent Application No. 10-2006-0088634 filed in the Korean Intellectual Property Office on Sep. 13, 2006, the disclosure of which is incorporated herein by reference.

BACKGROUND OF THE INVENTION (a) Field of the Invention

The present invention relates to a structure of an assist handle mounting bracket for absorbing impact of a vehicle in which the assist handle mounting bracket includes a member for absorbing impact in itself, thereby minimizing injuries on the head of a passenger.

(b) Description of the Related Art

Generally, a driver holds a steering wheel while a vehicle is running, thereby maintaining the stability of the vehicle. Passengers in a vehicle typically do not hold onto an object while a vehicle is running.

A conventional structure of an assist handle mounting bracket will be described with reference to FIG.3, which shows a conventional assist handle mounting bracket coupled to a roof side rail panel.

Accordingly, in most vehicles, a mounting member is inserted into the head lining 300, and an assist handle 200 which is grasped by a passenger for stability of the body is provided. An assist handle mounting bracket 100 should serve to absorb the impact as well as to fixing the assist handle 200 by a fixing member 250.

In order to supplement impact absorbing structure of the assist handle 200, a separate impact absorbing bracket is provided, or a separate impact absorbing member 500 is added between the assist handle mounting bracket 100 and a roof side rail panel 400, thereby realizing dual impact absorbing structure.

However, since such conventional methods add separate member, there are drawbacks in terms of weight or cost.

Therefore, the present invention provides a structure of an assist handle mounting bracket for absorbing impact of a vehicle in which an impact absorbing member is provided to an assist handle mounting bracket. The impact absorbing member comprises a bent portion so as to absorb the first impact with respect to a vehicle body panel mounting. The impact absorbing member also comprises a bracket which is cut and then rolled up so as to absorb the second impact with respect to a roof side rail panel, thereby alleviating impact when the head of a passenger collides with an assist handle so as to minimize injuries on the head of the passenger, and an impact absorbing structure is provided to the assist handle mounting bracket itself so as to reduce cost and weight.

SUMMARY OF THE INVENTION

In one embodiment of the present invention, a structure of an assist handle mounting bracket for absorbing the impact of a vehicle comprises a head lining and a roof side rail panel to which an assist handle is coupled by a fixing member. An impact absorbing member in this dual structure alleviates impact while being elastically deformed.

In another embodiment, the impact absorbing member may include: a bent part formed along a longitudinal direction of the assist handle mounting bracket; and a tongue piece part formed by being cut a specific portion of the assist handle mounting bracket and rolling up the same.

In another embodiment, the bent part may form an obtuse angle so as to be deformed in an elongation direction.

In yet another embodiment, the tongue piece part may form an acute angle so as to be deformed in a compression direction.

DESCRIPTION OF REFERENCE NUMERALS INDICATING PRIMARY ELEMENTS IN THE DRAWINGS

| | |
|---|---|
| 10: assist handle mounting bracket | 11: first coupling hole |
| 12: bent part | 13: second coupling hole |
| 14: tongue piece part | |

DETAILED DESCRIPTION OF THE EMBODIMENTS

An exemplary embodiment of the present invention will hereinafter be described in detail with reference to the accompanying drawings.

Figure 1:
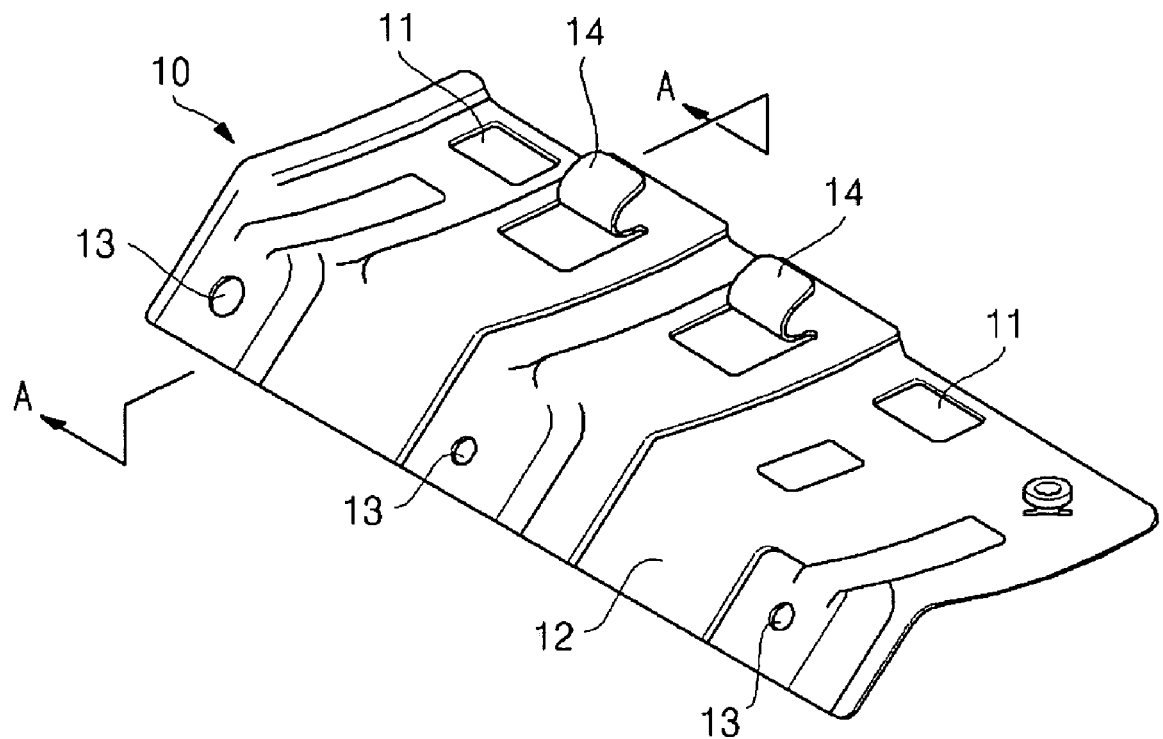
FIG. 1 is a drawing showing a state in which an assist handle mounting bracket according to an exemplary embodiment of the present invention is coupled to a roof side rail panel.
Figure 2:
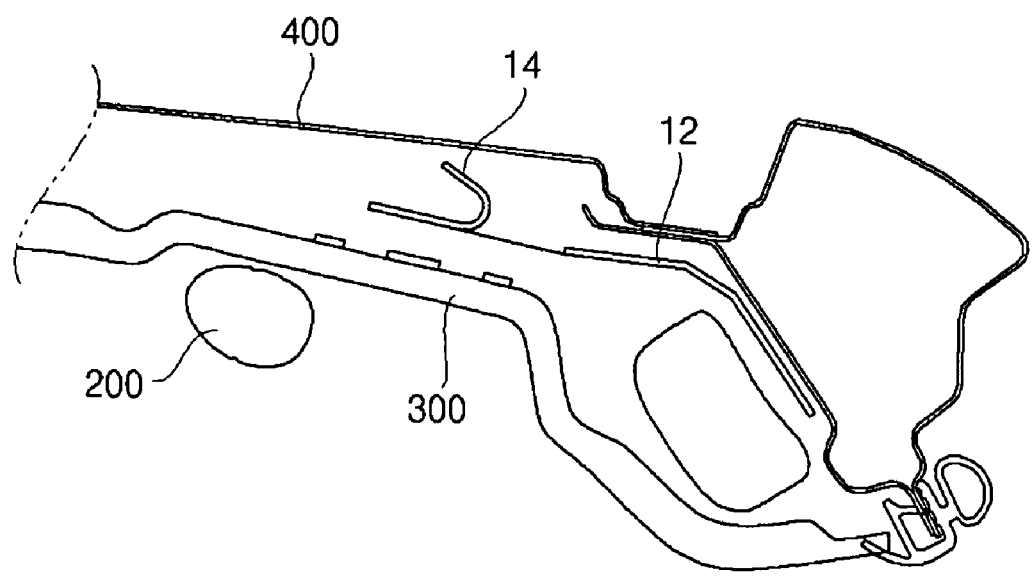
FIG. 2 is a cross sectional view taken along a line A-A in FIG. 1.
Figure 3:
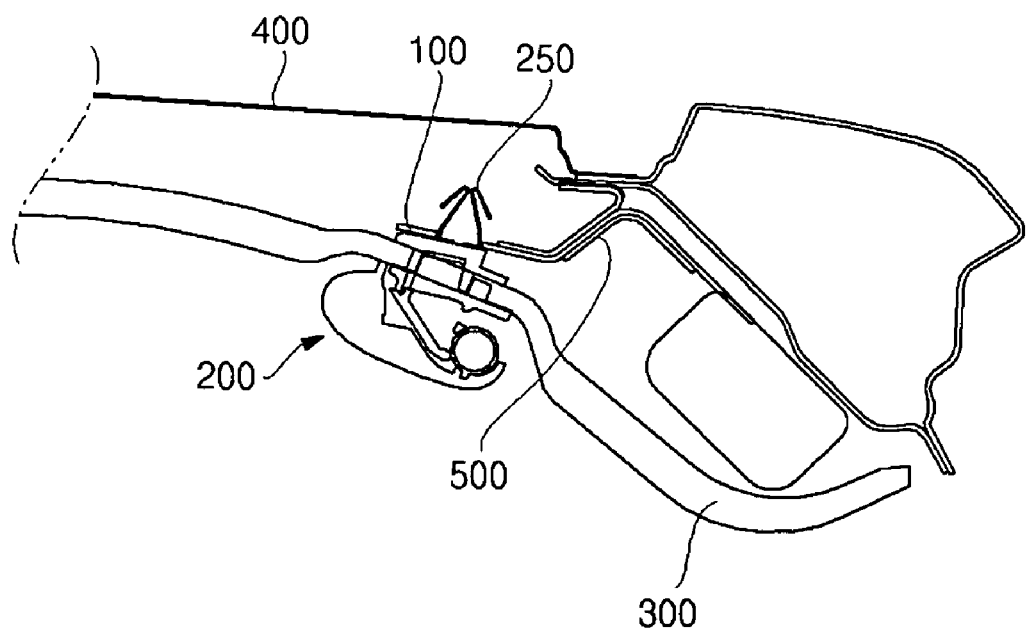
FIG. 3 is a cross sectional view showing a state in which a conventional assist handing mounting bracket is coupled to a roof side rail panel.

As shown in FIG. 1 and FIG. 2, an assist handle mounting bracket 10 is positioned between a head lining 300 and a roof side rail panel 400. The assist mounting bracket 10 is provided with first coupling holes 11 connecting an assist handle 200 to a specific portion of the bracket by a fixing member (not shown).

The first coupling holes 11 are formed to be spaced from one another by a specific distance to contact the head lining 300, and firmly connect the assist handle 200 to the head lining 300 by the fixing member.

The assist handle mounting bracket 10 is configured to absorb the shock, and for this purpose, a bent part 12 is formed by bending the assist handle mounting bracket 10 by a specific angle along the same direction as that in which the first coupling holes 11 are arranged.

At this time, the bent angle of the bent part 12 forms an obtuse angle, so that deformation is generated in an elongation direction.

The slanted surface of the bent part 12 contacts the surface of the roof side rail panel 400, and the second coupling holes 13 is connected to the roof side rail panel 400 by a fixing member which are formed in the slanted surface of the bent part 12.

In the case the bent part 12 receives compression energy by a collision with the head of a passenger, the bent part 12 converts the compression energy to deformation energy by elasticity or plasticity so as to alleviate an impact.

As such, when the assist handle mounting bracket 10 receives an impact while being fixed to the roof side rail panel 400, a first impact is absorbed by the bent part 12.

In addition, a tongue piece part 14 is formed by cutting a portion of a bracket plate between the first coupling holes 11 and rolling up the same so as to be bent by a specific angle.

At this time, an angle of the tongue piece part 14 forms an acute angle so as to be deformed in a compression direction.

As shown in FIG. 2, the tongue piece part 14 is formed to be spaced from the roof side rail panel 400 be a predetermined distance, and when a second impact acts on the assist handle 200 after the first impact, the tongue piece part 14 collides with the roof side rail panel 400 so as to receive a compression force, and is deformed by this force so as to alleviate the impact.

An operating principle of an assist handle mounting bracket according to an exemplary embodiment of the present invention will be explained hereinafter.

If a vehicle crash occurs, the head of a passenger collides with the assist handle 200. Consequently, the bent part 12 formed in the assist handle mounting bracket 10 and positioned between the head lining 300 and the roof side rail panel 400 receives a compression force, thereby converting the collision energy to deformation energy by elasticity or plasticity of the bent part 12. This alleviates the impact. In addition, the tongue piece part 14 formed in the assist handle mounting bracket 10 absorbs the impact energy, so that the impact acting on the body of a passenger can be substantially reduced.

Accordingly, in a structure of an assist handle mounting bracket according to an exemplary embodiment of the present invention, when the impact acts on the assist handle 200, the impact is absorbed by impact absorbing members (the bent part and the tongue piece part) formed in the assist handle mounting bracket 10 fixing the same, an injury to a passenger can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure of an assist handle mounting bracket for absorbing impact of a vehicle comprising:
   a head lining;
   a roof side rail panel configured for an assist handle to be coupled thereon; and
   an impact absorbing member, comprising a first impact absorbing portion and a second impact absorbing portion to alleviate impact while being elastically deformed, wherein the first impact absorbing portion absorbs a first impact and the second impact absorbing portion absorbs a second impact after the first impact occurs.

2. The structure of an assist handle mounting bracket for absorbing impact of a vehicle of claim 1, wherein
   the first impact absorbing portion comprises a bent part which is substantially parallel to a longitudinal direction of the assist handle; and
   the second impact absorbing portion comprises a tongue piece part that curves upward from the assist handle mounting bracket.

3. The structure of an assist handle mounting bracket for absorbing impact of a vehicle of claim 2, wherein a portion of the bent part comprises an obtuse angle so as to be expanded when the first impact occurs.

4. The structure of an assist handle mounting bracket for absorbing impact of a vehicle of claim 2, wherein the tongue piece part forms an acute angle so as to be compressed when the second impact occurs.

* * * * *